(12) United States Patent
Wiesinger et al.

(10) Patent No.: US 11,862,420 B2
(45) Date of Patent: Jan. 2, 2024

(54) INTERRUPTER UNIT FOR A CIRCUIT BREAKER

(71) Applicant: Siemens Energy Global GmbH & Co. KG, Munich (DE)

(72) Inventors: Claudia Wiesinger, Berlin (DE); Frank Reichert, Weissenfels (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 205 days.

(21) Appl. No.: 17/295,543

(22) PCT Filed: Oct. 21, 2019

(86) PCT No.: PCT/EP2019/078499
§ 371 (c)(1),
(2) Date: Aug. 3, 2021

(87) PCT Pub. No.: WO2020/104123
PCT Pub. Date: May 28, 2020

(65) Prior Publication Data
US 2021/0383992 A1 Dec. 9, 2021

(30) Foreign Application Priority Data
Nov. 20, 2018 (DE) .......................... 102018219832.2

(51) Int. Cl.
*H01H 33/70* (2006.01)
*H01H 33/74* (2006.01)
*H02B 5/06* (2006.01)

(52) U.S. Cl.
CPC ........ *H01H 33/7084* (2013.01); *H01H 33/74* (2013.01); *H02B 5/06* (2013.01)

(58) Field of Classification Search
CPC .. H01H 33/7084; H01H 33/74; H01H 33/901; H01H 33/91; H01H 2033/888;
(Continued)

(56) References Cited

U.S. PATENT DOCUMENTS 4,259,556 A 3/1981 Kii
4,471,187 A 9/1984 Sturzenegger et al.
(Continued)

FOREIGN PATENT DOCUMENTS

DE 2812947 A1 9/1978
EP 0195904 A1 10/1986
(Continued)

OTHER PUBLICATIONS

KR100857392 (Original document published May 9, 2008)) (Year: 2008).*
(Continued)

*Primary Examiner* — William A Bolton
(74) *Attorney, Agent, or Firm* — Laurence A. Greenberg; Werner H. Stemer; Ralph E. Locher

(57) ABSTRACT

An interrupter unit for a circuit breaker includes a gas-insulated housing, which is fillable with a quenching gas, and a gas-guiding structure, which is disposed in the housing and has a guide tube and at least one diverting element. The guide tube extends in tubular manner about a longitudinal axis of the interrupter unit in order to guide hot gas, which is created in an electric arc region of the interrupter unit by the heating of quenching gas by an electric arc, away from the electric arc region. The at least one diverting element is configured to set hot gas exiting from the guide tube in a circular flow running around the longitudinal axis.

14 Claims, 3 Drawing Sheets

(58) Field of Classification Search
CPC ....... H01H 2033/902; H01H 2033/907; H01H 2033/908; H02B 5/06
USPC .... 218/1, 12, 13, 45, 46, 53, 55, 57–61, 63, 218/68, 72, 79, 80, 85, 90, 93, 97, 116
See application file for complete search history.

(56) References Cited

U.S. PATENT DOCUMENTS

| | | | |
|---|---|---|---|
| 4,689,453 | A | 8/1987 | Horvath et al. |
| 6,717,791 | B1 | 4/2004 | Wiesinger |
| 7,041,928 | B2* | 5/2006 | Nowakowski ......... H01H 33/91 218/59 |
| 7,893,379 | B2* | 2/2011 | Schoenemann ........ H01H 33/74 218/46 |
| 8,389,886 | B2* | 3/2013 | Dahlquist .............. H01H 33/74 218/59 |
| 8,530,774 | B2* | 9/2013 | Grieshaber ............ H01H 33/74 218/51 |
| 9,076,611 | B2* | 7/2015 | Cernat ............... H01H 33/7015 |
| 9,673,006 | B2 | 6/2017 | Hermosillo et al. |
| 9,899,167 | B2* | 2/2018 | Florez ................ H01H 33/7015 |
| 2002/0158377 | A1* | 10/2002 | Dunne .................. C21C 5/4606 266/217 |

FOREIGN PATENT DOCUMENTS

| | | |
|---|---|---|
| EP | 1105898 B1 | 9/2002 |
| EP | 3248203 A1 | 11/2017 |
| FR | 2954995 A1 | 7/2011 |
| FR | 2954995 B1 | 9/2012 |
| JP | H0260013 A | 2/1990 |
| JP | 2016062679 A | 4/2016 |
| KR | 100857392 B1 | 9/2008 |
| WO | 2013045233 A1 | 4/2013 |
| WO | 2017162517 A1 | 9/2017 |

OTHER PUBLICATIONS

FR2954995 (Original document published Sep. 28, 2012) (Year: 2012).*

* cited by examiner

INTERRUPTER UNIT FOR A CIRCUIT BREAKER

BACKGROUND OF THE INVENTION

FIELD OF THE INVENTION:

The invention relates to an interrupter unit for a circuit breaker, which interrupter unit has a gas-insulated housing, which is fillable with a quenching gas.

Circuit breakers have contact elements which are movable relative to one another between a switch-off position, in which the contact elements are separated from one another, and a switch-on position, in which the contact elements bear against one another, for opening and closing an electrical circuit. A gas-insulated circuit breaker has an interrupter unit, which is filled with a quenching gas for quenching an electric arc which is created in an electric arc region of the interrupter unit when the contact elements are separated. The quenching gas is locally intensely heated by an electric arc in the electric arc region and dissociates to form a hot gas. The hot gas can lead to local dielectric weaknesses in the circuit breaker and is therefore cooled down, for example, by being mixed with relatively cold quenching gas or/and conducted from the electric arc region into a dielectrically less critical region of the interrupter unit.

SUMMARY OF THE INVENTION

The invention is based on the object of specifying a gas-insulated interrupter unit for a circuit breaker, which interrupter unit is improved in respect of the flow guidance of hot gas in the interrupter unit.

According to the invention, the object is achieved by the features described below.

The dependent claims relate to advantageous refinements of the invention.

An interrupter unit according to the invention for a circuit breaker comprises a gas-insulated housing, which is fillable with a quenching gas, and a gas-guiding structure, which is arranged in the housing and has a guide tube and at least one diverting element. The guide tube runs in a tubular manner about a longitudinal axis of the interrupter unit in order to guide hot gas, which is created in an electric arc region of the interrupter unit by heating quenching gas by an electric arc, away from the electric arc region. The at least one diverting element is designed to set hot gas exiting from the guide tube in a circular flow running around the longitudinal axis.

The invention therefore provides a flow guidance of hot gas in an interrupter unit, which flow guidance conducts hot gas through a guide tube axially, that is to say along the longitudinal axis of the interrupter unit, away from the electric arc region and sets hot gas exiting from the guide tube through at least one diverting element in a circular flow running around the longitudinal axis. As a result, hot gas is mixed, in a region remote from the electric arc region in the housing of the diverting element, with relatively cold quenching gas located there by the circular flow and cooled down by so-called turbulent cooling. Owing to the circular flow, the volume of the housing of the interrupter unit is better utilized for cooling hot gas and therefore cooling of the hot gas is improved in relation to cooling which uses only an axial or radial flow of hot gas. As a result, the dielectric strength of the interrupter unit can in turn be increased, and the interrupter unit can be designed for higher currents.

One refinement of the invention provides a strip-like diverting element, which projects from a tube outer surface of the guide tube and runs around the longitudinal axis in a helically wound manner. In this case, a diverting surface of the strip-like diverting element, which diverting surface adjoins the tube outer surface and faces the electric arc region, can project from the tube outer surface at a projection angle that is different from 90 degrees. The guide tube can further have lateral tube openings in the region of the strip-like diverting element. In particular, the opening sizes of the lateral tube openings can increase as the distance of the tube openings from the electric arc region increases.

The abovementioned refinements of the invention create a circular flow of hot gas through a strip-like diverting element which runs around the outer surface of the guide tube in a helical manner. The circular flow guidance can be optimized by way of a suitably selected projection angle. The tube openings allow lateral exit of hot gas from the guide tube to the diverting element. The increase in the opening sizes of the lateral tube openings at a distance from the electric arc region has the effect that hot gas can exit from the guide tube in greater quantities only as the distance from the electric arc region increases and therefore at most small quantities of hot gas return to the electric arc region.

A further refinement of the invention provides a turbine-like diverting element which runs in an annular manner about an open guide tube end of the guide tube, which guide tube end is averted from the electric arc region, and has diverting blades, which project outward from the guide tube. For example, the diverting blades have blade surfaces which are tilted in relation to a plane that is orthogonal to the longitudinal axis. The turbine-like diverting element can further be rotatable about the longitudinal axis.

The abovementioned refinements of the invention cause a circular flow of hot gas through a diverting element of turbine-like design. The circular flow guidance can be optimized by way of suitably selected tilting. The circular flow can be cooled in a turbulent manner owing to a rotatability of the diverting element.

A further refinement of the invention provides a snail-like diverting element which projects through an open guide tube end, which is averted from the electric arc region, into the guide tube and has a groove which faces the electric arc region. The groove is substantially in the form of a conical spiral which runs around the longitudinal axis and the diameter of which decreases in the direction of the electric arc region. A funnel element can further be provided, which is arranged in front of the snail-like diverting element on the electric arc region side in the guide tube and has a funnel opening, through which the longitudinal axis runs. For example, the funnel element tapers conically in the direction of the electric arc region at least in a region that runs around the funnel opening. The guide tube can further have lateral tube openings in the region of the snail-like diverting element. In this case, the opening sizes of the lateral tube openings can, in particular, increase as the distance of the tube openings from the electric arc region increases.

The abovementioned refinements of the invention cause a circular flow of hot gas through a snail-like diverting element with a groove which is in the form of a conical spiral. Hot gas can be supplied through the funnel element to the electric arc region-side end of the groove, so that the hot gas supplied to the diverting element follows the profile of the groove from its electric arc region-side end and is set in circular flow in a particularly efficient manner. Circularly flowing hot gas can be guided through the lateral tube openings in the guide tube into the outer region of the guide tube in order to be mixed with relatively cold quenching gas located there and as a result to be cooled in a turbulent manner.

A further refinement of the invention provides that the guide tube is arranged between the electric arc region and an end region of the housing at a distance from an inner surface of the housing. As a result, hot gas is guided through the guide tube into an end region of the housing and therefore advantageously far away from the electric arc region.

A circuit breaker according to the invention has an interrupter unit according to the invention. The advantages of such a circuit breaker result from the abovementioned advantages of an interrupter unit according to the invention.

The above-described properties, features and advantages of this invention and the way in which they are achieved will become clearer and more distinctly comprehensible in connection with the following description of exemplary embodiments which are explained in more detail in connection with the drawings.

DETAILED DESCRIPTION OF THE INVENTION

Mutually corresponding parts are provided with the same reference symbols in the figures.

Figure 1:
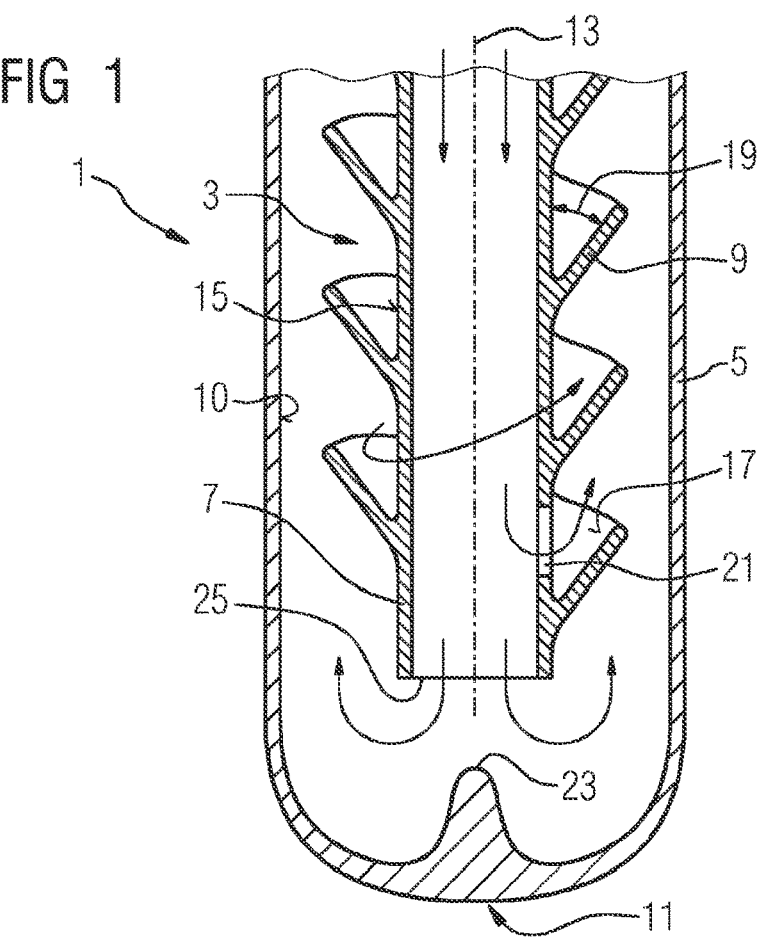
FIG. 1 shows a sectional illustration of an interrupter unit for a circuit breaker having a first exemplary embodiment of a gas-guiding structure.
Figure 2:
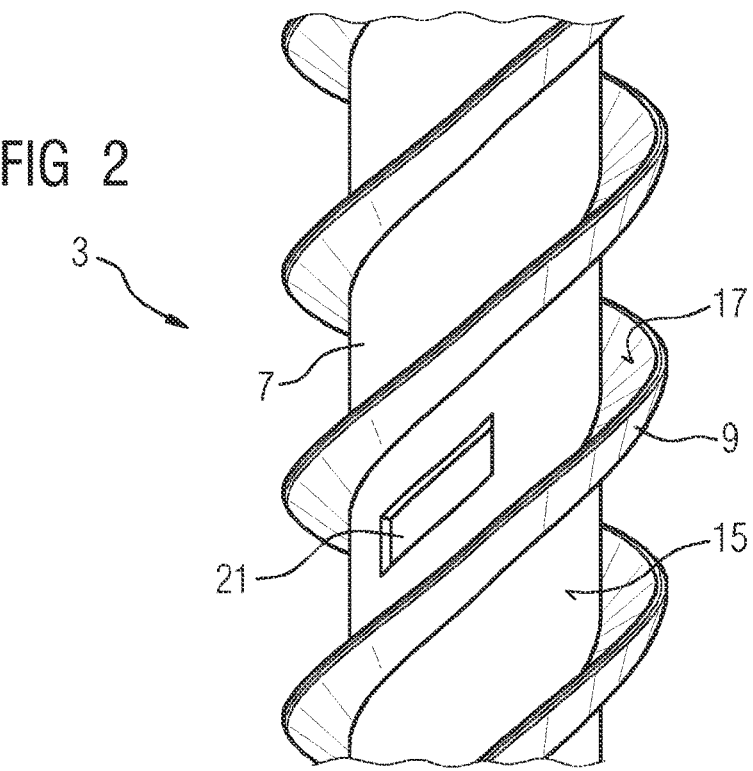
FIG. 2 shows a perspective illustration of the gas-guiding structure shown in FIG. 1.

FIG. 1 shows sectional illustration of an interrupter unit 1 for a circuit breaker having a first exemplary embodiment of a gas-guiding structure 3, wherein the interrupter unit 1 is illustrated only in a region that is relevant to the invention. FIG. 2 shows a detail of a perspective illustration of the gas-guiding structure 3 shown in FIG. 1.

The interrupter unit 1 has a gas-insulated housing 5, which is fillable with a quenching gas. Amongst other things, contact elements, not illustrated in FIG. 1, are arranged in the housing 5, which contact elements are movable relative to one another between a switch-off position, in which the contact elements are separated from one another, and a switch-on position, in which the contact elements bear against one another, for opening and closing an electrical circuit. In particular, the interrupter unit 1 has electric arc contact elements between which an electric arc burns in an electric arc region of the interrupter unit 1 in the event of separation.

The gas-guiding structure 1 has a guide tube 7 and a strip-like diverting element 9. The guide tube 7 is arranged between the electric arc region and an end region 11 of the housing 5 at a distance from an inner surface 10 of the housing 5. The guide tube 7 runs in a tubular manner about a longitudinal axis 13 of the interrupter unit 1 in order to guide hot gas, which is created in the electric arc region by heating quenching gas by an electric arc.

The diverting element 9 projects from a tube outer surface 15 of the guide tube 7 and runs around the longitudinal axis 13 in a helically wound manner. A diverting surface 17 of the diverting element 9, which diverting surface adjoins the tube outer surface 15 and faces the electric arc region, projects from the tube outer surface 15 at a projection angle 19 that is different from 90 degrees. In the exemplary embodiment shown in FIG. 1, the projection angle 19 is less than 90 degrees. However, as an alternative, the projection angle 19 can also be greater than 90 degrees.

The guide tube 7 has lateral tube openings 21 in the region of the strip-like diverting element 9. The opening sizes of these tube openings 21 increase as the distance of the tube openings 21 from the electric arc region increases. The inner surface 10 of the housing 5 has, in the end region 11 of the housing 5, a curved portion 23 which faces an open guide tube end 25 of the guide tube 7.

Hot gas flows from the electric arc region substantially axially, that is to say along the longitudinal axis 13, through the guide tube 7. A portion of the hot gas flowing through the guide tube 7 exits from the lateral tube openings 21 out of the guide tube 7 to the diverting element 9. The other portion of the hot gas exits out of the guide tube end 25 of the guide tube 7 and is guided by the inner surface 10 of the housing 5 in the direction of the diverting element 9. Hot gas exiting from the guide tube 7 is set by the diverting element 9 in a circular flow which runs in a helical manner around the longitudinal axis 13 outside the guide tube 7 and is mixed with relatively cold quenching gas located there, as a result of which the hot gas is cooled down by so-called turbulent cooling. Directions of flow of the flow of the hot gas are indicated by arrows in FIG. 1.

Figure 3:
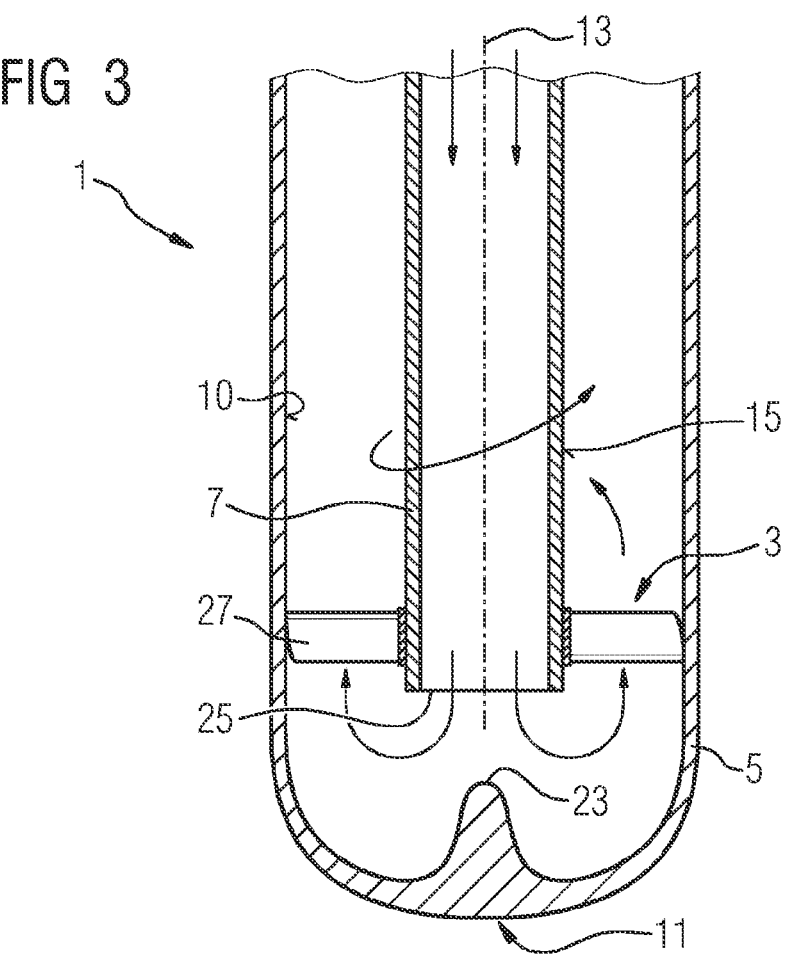
FIG. 3 shows a sectional illustration of an interrupter unit for a circuit breaker having a second exemplary embodiment of a gas-guiding structure.

FIG. 3 shows a sectional illustration of an interrupter unit 1 for a circuit breaker having a second exemplary embodiment of a gas-guiding structure 3, wherein the interrupter unit 1 is once again illustrated only in a region that is relevant to the invention.

The gas-guiding structure 1 has a guide tube 7 and a turbine-like diverting element 27. As in the exemplary embodiment shown in FIG. 1, the guide tube 7 is arranged between the electric arc region and an end region 11 of the housing 5 at a distance from an inner surface 10 of the housing 5 of the interrupter unit 1 and runs in a tubular manner about the longitudinal axis 13 of the interrupter unit 1.

Figure 4:
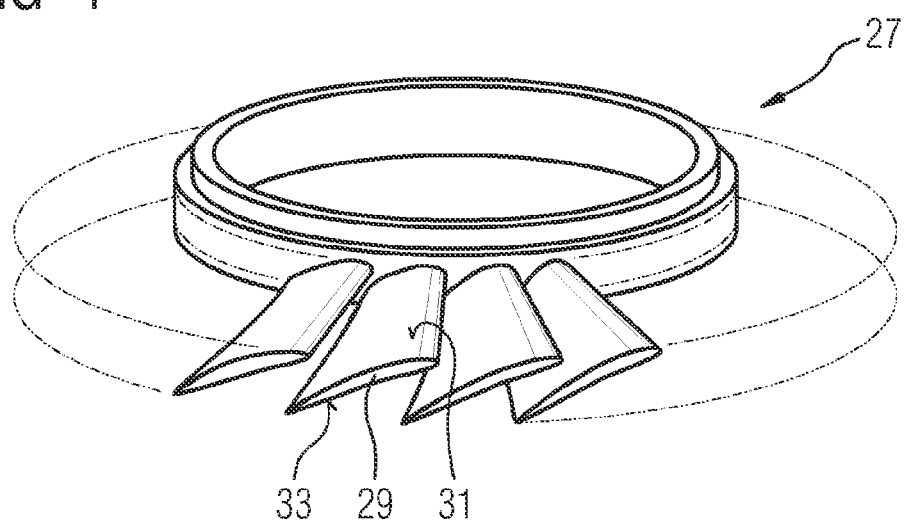
FIG. 4 shows a perspective illustration of the diverting element of the gas-guiding structure shown in FIG. 3.

FIG. 4 shows a perspective illustration of the diverting element 27. The diverting element 27 runs in an annular manner around the open guide tube end 25 of the guide tube 7, which guide tube end is averted from the electric arc region, and has diverting blades 29, which project outward from the guide tube 7. The diverting blades 29 have blade surfaces 31, 33 which are tilted with respect to a plane that is orthogonal to the longitudinal axis 13. The diverting element 27 can be arranged in a stationary manner in relation to the guide tube 7 or can be designed in a manner rotatable about the longitudinal axis 13.

The inner surface 10 of the housing 5 has, in the end region 11 of the housing 5, a curved portion 23 which faces the open guide tube end 25 of the guide tube 7.

Hot gas flows from the electric arc region substantially axially through the guide tube 7, exits from the guide tube end 25 out of the guide tube 7 and is guided through the inner surface 10 of the housing 5 to the diverting element 27. The hot gas is set by the diverting element 27 in a circular flow which runs in a helical manner around the longitudinal axis 13 outside the guide tube 7 and mixed with relatively cold quenching gas located there, as a result of which the hot gas is cooled down by turbulent cooling. Directions of flow of the flow of the hot gas are also indicated by arrows in FIG. 3.

Figure 5:
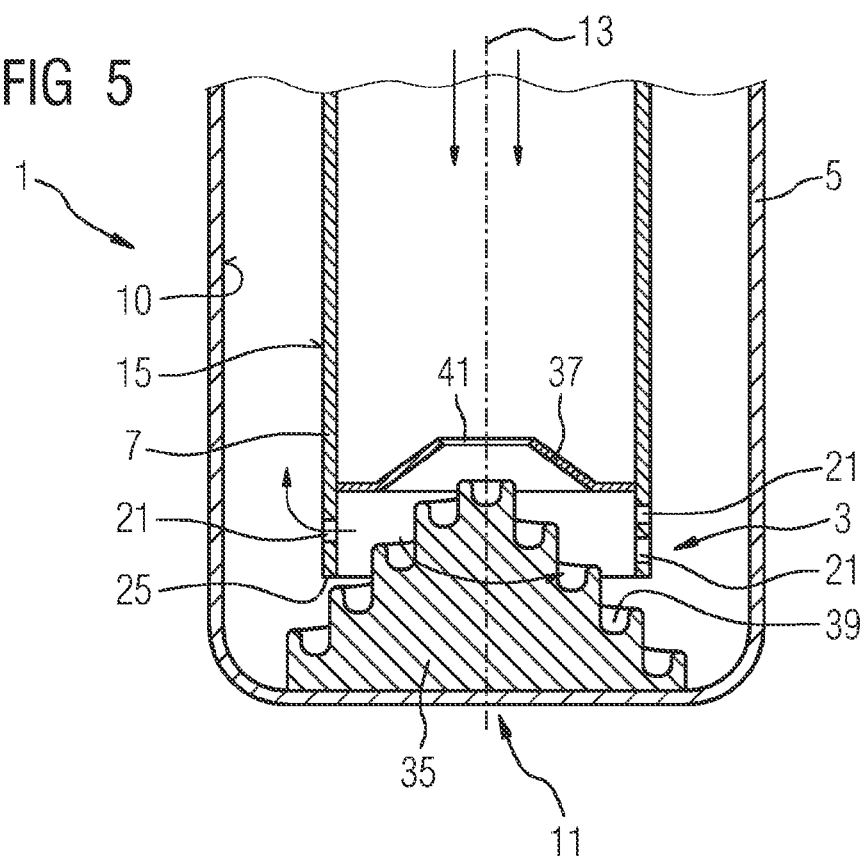
FIG. 5 shows a sectional illustration of an interrupter unit for a circuit breaker having a third exemplary embodiment of a gas-guiding structure.

FIG. 5 shows a sectional illustration of an interrupter unit 1 for a circuit breaker having a third exemplary embodiment of a gas-guiding structure 3, wherein the interrupter unit 1 is once again illustrated only in a region that is relevant to the invention.

The gas-guiding structure 1 has a guide tube 7, a snail-like diverting element 35 and a funnel element 37. As in the exemplary embodiment shown in FIG. 1, the guide tube 7 is arranged between the electric arc region and an end region 11 of the housing 5 at a distance from an inner surface 10 of the housing 5 of the interrupter unit 1 and runs in a tubular manner about the longitudinal axis 13 of the interrupter unit 1.

Figure 6:
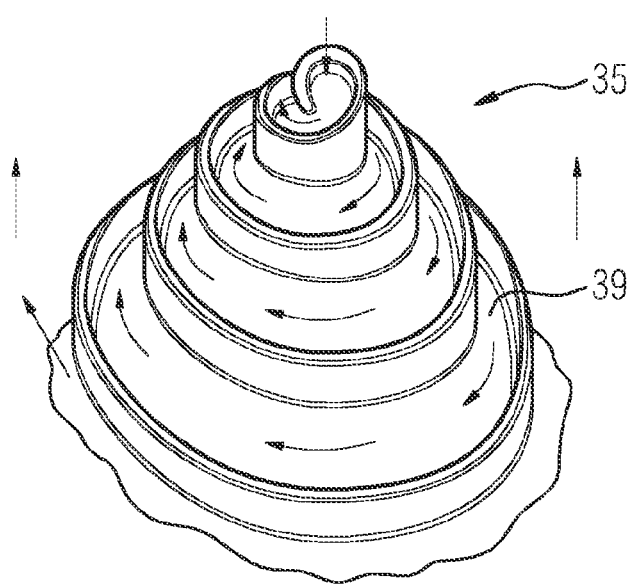
FIG. 6 shows a perspective illustration of the diverting element of the gas-guiding structure shown in FIG. 5.

FIG. 6 shows a perspective illustration of the diverting element 35. The diverting element 35 is arranged in the end region 11 of the housing 5 and projects through the open guide tube end 25, which is averted from the electric arc region, into the guide tube 7. The diverting element 35 has a groove 39 which faces the electric arc region and is substantially in the form of a conical spiral which runs around the longitudinal axis 13 and the diameter of which decreases in the direction of the electric arc region.

The funnel element 37 is arranged in front of the diverting element 35 on the electric arc region side in the guide tube 7 and has a funnel opening 41, through which the longitudinal axis 13 runs. The funnel element 37 tapers conically in the direction of the electric arc region in a region that runs around the funnel opening 41.

The guide tube 7 has lateral tube openings 21 in the region of the diverting element 35 between the funnel element 37 and the end region 11 of the housing 5. The opening sizes of these tube openings 21 increase as the distance of the tube openings 21 from the electric arc region increases.

Hot gas flows from the electric arc region substantially axially through the guide tube 7 to the funnel element 37 and through the funnel opening 41 to the diverting element 35. The groove 39 of the diverting element 35 sets the hot gas in a circular flow, which follows the groove 39, around the longitudinal axis 13. A portion of the hot gas exits from the lateral tube openings 21 out of the guide tube 7. The other portion of the hot gas exits out of the guide tube end 25 of the guide tube 7. Outside the guide tube 7, hot gas flows in a circular manner around the longitudinal axis 13 and is mixed with relatively cold quenching gas located there, as a result of which the hot gas is cooled down by turbulent cooling. Directions of flow of the flow of the hot gas are once again indicated by arrows in FIGS. 5 and 6.

The exemplary embodiments shown in FIGS. 1 to 6 can also be combined with one another. For example, the guide tube 7 of the exemplary embodiment shown in FIGS. 3 and 4 or in FIGS. 5 and 6 can have a section on which a strip-like diverting element 9 shown in FIGS. 1 and 2 is arranged.

Although the invention has been illustrated and described in more detail by preferred exemplary embodiments, the invention is not restricted by the disclosed examples, and other variations can be derived therefrom by a person skilled in the art without departing from the scope of protection of the invention.

The inention claimed is:

1. An interrupter unit for a circuit breaker, the interrupter unit comprising:
    a gas-insulated housing configured to be filled with a quenching gas;
    a gas-guiding structure disposed in said housing, said gas-guiding structure having a guide tube and at least one diverting element;
    said guide tube extending in a tubular manner about a longitudinal axis of the interrupter unit to guide hot gas created in an electric arc region of the interrupter unit away from the electric arc region by using an electric arc to heat quenching gas, said guide tube having an open guide tube end facing away from the electric arc region;
    said at least one diverting element configured to set the hot gas exiting from said guide tube in a circular flow running around the longitudinal axis;
    said at least one diverting element being snail-shaped and projecting through said open guide tube end into said guide tube;
    said at least one snail-shaped diverting element having a groove facing the electric arc region, said groove being formed as a conical spiral running around the longitudinal axis; and
    said conical spiral having a diameter decreasing in a direction toward the electric arc region.

2. The interrupter unit according to claim 1, wherein said guide tube has a tube outer surface, and said at least one diverting element is strip-shaped, projects from said tube outer surface and runs around the longitudinal axis in a helically wound manner.

3. The interrupter unit according to claim 2, wherein said at least one strip-shaped diverting element has a diverting surface adjoining said tube outer surface, facing the electric arc region and projecting from said tube outer surface at a projection angle being different from 90 degrees.

4. The interrupter unit according to claim 2, wherein said guide tube has lateral tube openings in a region of said at least one strip-shaped diverting element.

5. The interrupter unit according to claim 4, wherein said lateral tube openings have opening sizes increasing as a distance of said lateral tube openings from the electric arc region increases.

6. The interrupter unit according to claim 1, wherein:
    said at least one diverting element is turbine-shaped and runs in an annular manner about said open guide tube end; and
    diverting blades project outward from said guide tube.

7. The interrupter unit according to claim 6, wherein said diverting blades have blade surfaces being tilted relative to a plane orthogonal to the longitudinal axis.

8. The interrupter unit according to claim 6, wherein said at least one turbine-shaped diverting element is rotatable about the longitudinal axis.

9. The interrupter unit according to claim 1, which further comprises a funnel element disposed between said at least one snail- shaped diverting element and the electric arc region in said guide tube, said funnel element having a funnel opening through which the longitudinal axis runs.

10. The interrupter unit according to claim 9, wherein said funnel element tapers conically in a direction of the electric arc region, at least in a region running around said funnel opening.

11. The interrupter unit according to claim 1, wherein said guide tube has lateral tube openings in a region of said at least one snail-shaped diverting element.

12. The interrupter unit according to claim 11, wherein said lateral tube openings have opening sizes increasing as a distance of said lateral tube openings from the electric arc region increases.

13. The interrupter unit according to claim 1, wherein said housing has an inner surface and an end region, and said guide tube is disposed between the electric arc region and said end region at a distance from said inner surface.

14. A circuit breaker, comprising an interrupter unit according to claim 1.

* * * * *